(12) United States Patent
Hubner et al.

(10) Patent No.: US 8,196,840 B2
(45) Date of Patent: Jun. 12, 2012

(54) KEYBOARD WITH HORIZONTAL CARD READER

(75) Inventors: Horst Hubner, Bayreuth (DE); Marcus Kuchler, Munich (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 200 days.

(21) Appl. No.: 12/742,771

(22) PCT Filed: Nov. 12, 2008

(86) PCT No.: PCT/EP2008/065360
§ 371 (c)(1),
(2), (4) Date: May 13, 2010

(87) PCT Pub. No.: WO2009/065756
PCT Pub. Date: May 28, 2009

(65) Prior Publication Data
US 2010/0264220 A1     Oct. 21, 2010

(30) Foreign Application Priority Data
Nov. 22, 2007  (DE) .................. 10 2007 047 845

(51) Int. Cl.
*G06K 13/06* (2006.01)
*G06K 13/24* (2006.01)

(52) U.S. Cl. .................. 235/483; 235/375; 400/472

(58) Field of Classification Search .................. 235/483, 235/375, 145 R, 486; 400/472, 477
See application file for complete search history.

(56) References Cited

U.S. PATENT DOCUMENTS

| | | | |
|---|---|---|---|
| 5,091,618 A | 2/1992 | Takahashi | |
| 6,056,193 A | 5/2000 | McAuliffe et al. | |
| 6,443,361 B1 | 9/2002 | Kklatt et al. | |
| 2001/0032882 A1 | 10/2001 | Roussy et al. | |
| 2005/0036814 A1 * | 2/2005 | Sim | 400/472 |
| 2006/0157566 A1 | 7/2006 | Kawasaki et al. | |
| 2007/0034677 A1 | 2/2007 | Itoshiro et al. | |
| 2007/0045392 A1 | 3/2007 | Youens et al. | |
| 2009/0065585 A1 * | 3/2009 | Gerhard | 235/482 |

FOREIGN PATENT DOCUMENTS

| | | |
|---|---|---|
| DE | 298040165 U1 | 6/1998 |
| EP | 0 399 763 A2 | 11/1990 |
| EP | 0 843 250 A1 | 5/1998 |
| EP | 0 863 477 A1 | 9/1998 |
| JP | 2003 067115 A | 3/2003 |
| JP | 2003067115 A * | 3/2003 |
| WO | 99/46669 A1 | 9/1999 |

\* cited by examiner

*Primary Examiner* — Edwyn Labaze
(74) *Attorney, Agent, or Firm* — Davis & Bujold, P.L.L.C.

(57) ABSTRACT

A keyboard (1) with a horizontally arranged card reader. The card reader has a card insertion opening (2) and a card holder section (3). The card holder section (3) defines a plane for placing a card on the upper surface of the keyboard (1). The card holder section (3) is arranged next to the card insertion opening (2), into which the card can be inserted substantially parallel to the plane defined by the card holder section (3).

13 Claims, 3 Drawing Sheets

KEYBOARD WITH HORIZONTAL CARD READER

This application is a National Stage completion of PCT/EP2008/065360 filed Nov. 12, 2008, which claims priority from German patent application serial no. 10 2007 047 845.5 filed Nov. 22, 2007.

FIELD OF THE INVENTION

The invention relates to a keyboard with a card reader, in particular to a keyboard with a horizontally arranged card reader.

BACKGROUND OF THE INVENTION

In keyboards, the trend is toward ever-flatter configurations. Thus, card readers integrated in keyboards should not interfere with the flat shape of the keyboard, as happens when a card reader is arranged vertically on the upper side of a keyboard. If, in addition, the function of a RFID card reader is to be integrated into the keyboard, then in the case of a keyboard with a vertically arranged card reader it is necessary to provide additional holding means for the card, such as a clip into which the card can be inserted. To overcome this drawback keyboards with horizontally arranged card readers have been developed. In these the card is introduced into a slot on one side of the keyboard, so the card can no longer be seen and can therefore easily be forgotten in the card reader, which is critical above all in the case of cards for authorization systems. Moreover, for a user it is not easy to see which way round the card is to be inserted into the slot. In existing contact-making units the contact block for the chip in the card is often positioned on the underside, so a user has to insert the card with its upper side facing downward, which is counter-intuitive. Besides, the introduction of the card from the side into the card reader slot is ergonomically inconvenient, since the card must be held with two fingers and, particularly in the case of very flay keyboards, this can result in contact of the user's finger with the working surface. Extracting the card can often also be a problem, since the card projects only a very short way out of the card reader. Moreover, the insertion and extraction of the card require a sufficiently large free space on the side from which the card is to be inserted.

SUMMARY OF THE INVENTION

The purpose of the present invention is therefore to make available a keyboard with a card reader which is of flat design and whose card reader, despite the flat configuration of the keyboard, is ergonomically conveniently designed and easy to operate, but which is also inexpensive to manufacture.

These objectives are achieved by a keyboard with a card reader according to the invention.

A keyboard according to the invention has a card reader that comprises a card insertion opening and a card holder section. The card insertion opening is used to insert a card into the card reader. The card holder section defines a plane for supporting a card on the upper side of the keyboard, so that the card can be placed in a position on the keyboard from which the card can be inserted into the card reader while remaining visible to the user.

The plane can be formed for example by a flat area on the upper side of the keyboard. Alternatively, the plane can also be defined by ribs or similar supporting elements formed on the upper side of the keyboard.

The card holder section is positioned next to the card insertion opening and a card placed on the card holder section can essentially be inserted into the card insertion opening parallel to the plane defined by the card holder section, since the card lying on the card holder section can be pushed into the card insertion opening. To do this only one finger is needed. Moreover, the card holder section prevents any possible bending of the card, as can happen when inserting card into card readers of the prior art.

In a preferred embodiment of the keyboard with card reader according to the invention, the card holder section has a guiding element for guiding the card while it is being inserted into the card insertion opening. The guiding element can be, for example, a strip formed on the upper side of the keyboard, along the side surface of which the card can be pushed into the card insertion opening. Preferably, the card holder section has two such guiding elements arranged on opposite sides of the card, so that the card can only be pushed in one direction perpendicularly to the card insertion opening. The guiding elements also make it possible for the plane defined by the card holder section to be inclined in a direction perpendicular to the guiding elements, without thereby causing a card placed on it to fall.

In a further preferred embodiment of the keyboard with a card reader according to the invention, at its end opposite the card insertion opening the card holder section borders on an edge section of the upper side of the keyboard, so that the upper side of the keyboard is delimited there by the card holder section. This design is ergonomically particularly convenient for placing the card onto the card holder section when the card is brought in from the side.

Preferably, the card reader is arranged at one of the two upper corners of the keyboard, the upper corner on the right being best for a right-handed user and that on the left for a left-handed user.

In a further preferred embodiment of the keyboard with a card reader according to the invention, the card can be inserted into the card insertion opening of the card reader to a depth of approximately a third of its length. This leaves around two-thirds of the card still visible by the user, so the user can easily see whether the card is still in the card reader.

In a further preferred embodiment of the keyboard with a card reader according to the invention, the card can be inserted into the card insertion opening of the card reader to a depth approximately half its length. This leaves around half the card still visible by the user, so that in this embodiment as well the user can easily see whether the card is still in the card reader.

In determining the length of the card that can be inserted into the card reader, among other things the specified value of the electrostatic discharge (ESD value) is decisive, so in further embodiments of the keyboard with a card reader according to the invention the length of the part of the card that can be inserted into the card reader will be within a range from about a third to about two-thirds of the card's length.

In a further preferred embodiment of the keyboard with a card reader according to the invention, the card holder section has a card-supporting surface whose dimension in a direction perpendicular to the card insertion opening corresponds to at least half the length of the card, so that a card placed on the card holder section but not yet inserted into the card insertion opening cannot fall off. The card-supporting surface can for example consist of a flat surface, or it can be formed by ribs extending perpendicular to the card insertion opening.

Preferably, the size of the card-supporting surface is such that when the card is inserted its edge is flush with that of the card-supporting surface, and when it has not been inserted it projects in a direction perpendicular to the card insertion opening, outside the card-supporting surface, by the length to which the card can be inserted into the card reader. This makes it easy for a user to see whether the card has been inserted or not.

In a particularly preferred embodiment of the keyboard with a card reader according to the invention, the card holder section is formed as a depression in the upper side of the keyboard so that the card-supporting surface is the bottom face of a recess in the upper side of the keyboard, whose dimensions are approximately those of a card lying therein. In one sidewall of the recess is the card insertion opening, and the two sidewalls adjacent to the latter fulfill the function of two guiding elements. This embodiment makes for a particularly flat shape of the keyboard, since the top side of the card insertion opening is flush with the surface of the keyboard's upper side that forms the area for the key set.

In a further preferred embodiment of the keyboard with card reader according to the invention, the card reader also comprises means for wireless communication with a chip-card, so that a keyboard with card reader according to the invention can also communicate with chip-cards requiring no contact by means of a radio protocol.

Preferably, the means for wireless communication with a chip-card comprise an antenna, which is arranged underneath the card holder section. An arrangement of the antenna under the card holder section enables an optimum connection between the chip-card and the card reader when the chip-card is placed on the card holder section.

In a further preferred embodiment of the keyboard with the card reader, the electronic circuitry of the card reader is integrated on the printed circuit board of the keyboard. This saves components and simplifies assembly, both of which result in reduced production costs.

BRIEF DESCRIPTION OF THE DRAWINGS

Below, the invention is described in detail with reference to the drawings, which show.

DETAILED DESCRIPTION OF THE PREFERRED EMBODIMENTS

Figure 1:
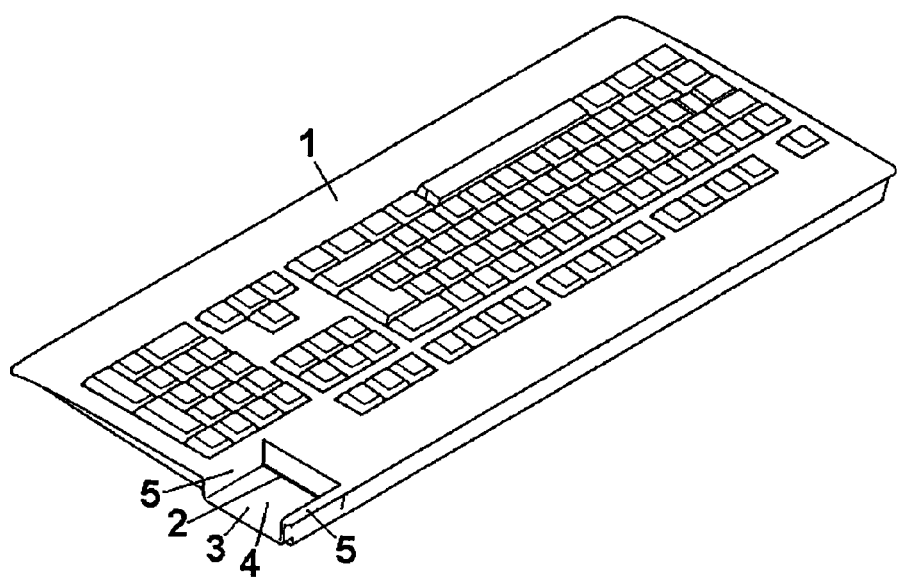
FIG. 1: Perspective view of an embodiment of a keyboard with card reader according to the invention.

The representation in FIG. 1 shows a perspective view of an embodiment of a keyboard with a card reader according to the invention. The illustration shows the keyboard (1) with its side opposite a user at the front, in order to be able to show the card reader more clearly. In this embodiment the card reader is arranged in the right-hand top corner of the keyboard (1). The card reader has a card insertion opening (2) and a card holder section (3). The card holder section (3) is formed as a recess in the upper side of the keyboard (1). The card insertion opening (2) is in one sidewall of the recess. On its side opposite the card insertion opening (2) the card holder section (3) is bounded by the right-hand edge of the keyboard's upper side, so that the keyboard's upper side ends with the card holder section (3). The card holder section (3) has a card-supporting surface (4) formed by the bottom face of the recess. The card-supporting surface (4) is a flat surface approximately as wide as a card. The two sidewalls (5) of the recess act as two guiding elements so that a card to be introduced can essentially only be pushed along the card-supporting surface (4) in a direction perpendicular to the card insertion opening (2). This embodiment of a keyboard with card reader according to the invention makes for a particularly flat shape of the keyboard (1), since the upper side of the card insertion opening (2) is flush with the surface of the keyboard's upper side forming the key set area.

Figure 2:
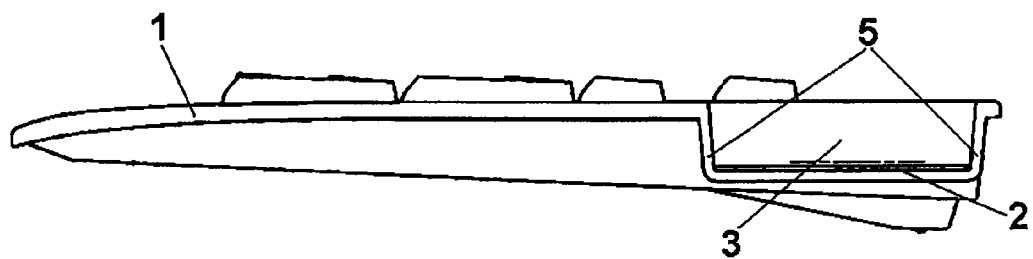
FIG. 2: Side view of the embodiment shown in FIG. 1.

The representation in FIG. 2 shows a view of the right-hand side of the embodiment in FIG. 1. The image makes clear the flat design of this embodiment with its trough-shaped recess forming the card holder section (3).

Figure 3:
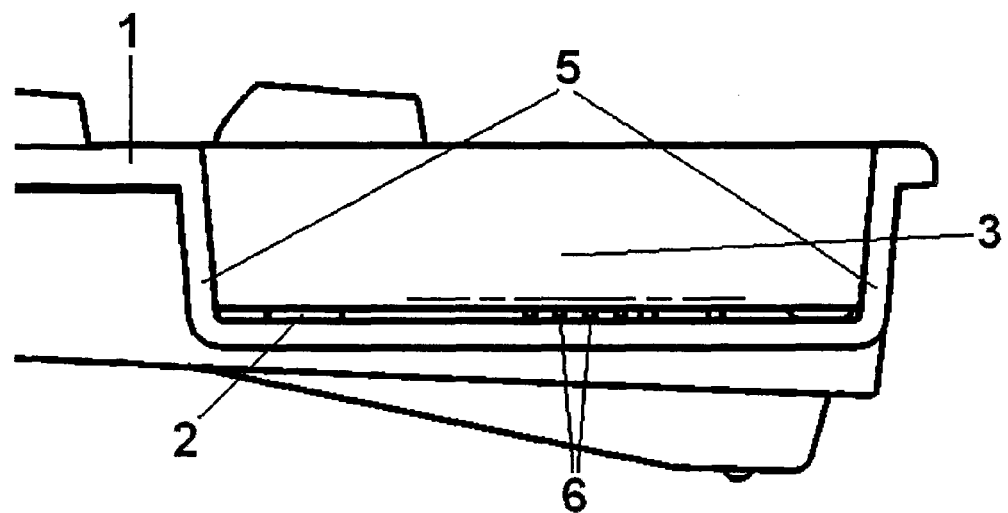
FIG. 3: View of a detail of FIG. 2 in the card reader area.

FIG. 3 shows a detail view of FIG. 2 in the area of the card reader. In this view the electronic contacts (6) for contact-entailing communication with a chip on a card in the card reader can be glimpsed through the card insertion opening (2).

Figure 4:
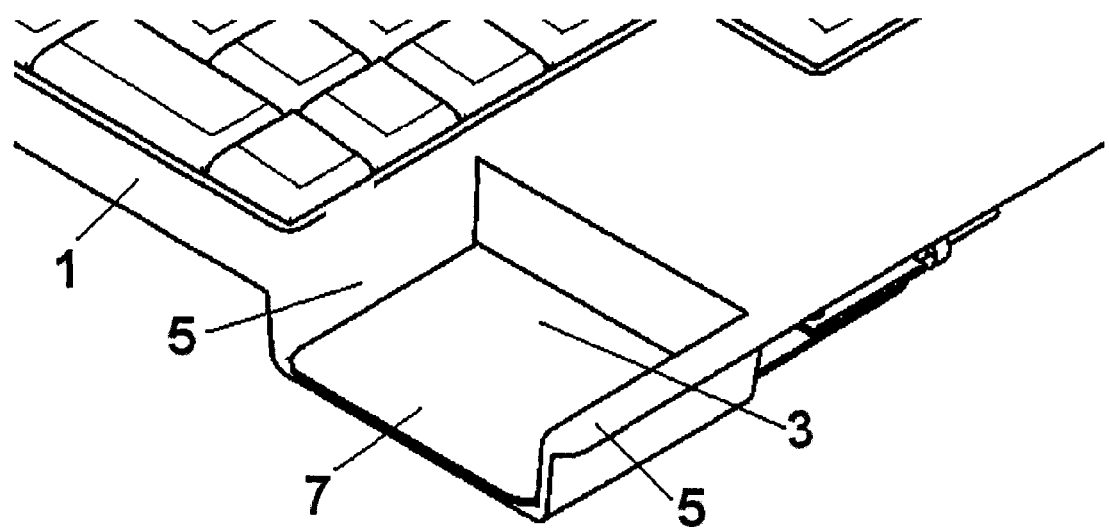
FIG. 4: Detailed perspective view of the card reader of the embodiment shown in FIG. 1, with card inserted.

A perspective view of a detail of the card reader of the embodiment in FIG. 1 is shown in FIG. 4. The figure shows the card reader with a card (7) inserted in it. From the figure it can be seen that even when the card (7) has been inserted, a large part of it is still visible by a user. In the case illustrated, the portion still visible corresponds to about half to two-thirds of the card (7). It can also be seen that at its end projecting out of the card reader, the card (7) inserted in the card reader ends essentially flush with the card holder section (3), so that a user can easily distinguish between when a card has been inserted into the card reader and when it has not. In the figure the card reader is shown partially sectioned, so that at the right-hand edge of the drawing something of the interior of the card reader can be seen.

Figure 5:
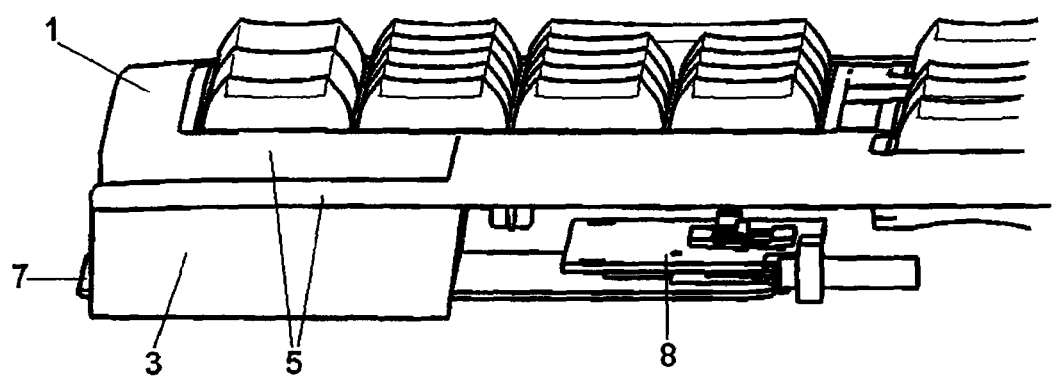
FIG. 5: Partially sectioned representation of the card reader of the embodiment shown in FIG. 1.

A more informative view inside the card reader is shown in FIG. 5. The figure shows a side view of the card reader partially sectioned as in FIG. 4. The image shows the contactor unit (8) for contact-entailing communication with a chip in a card (7). The contactor unit (8) is arranged in such manner that the contacts (not visible in the representation according to FIG. 5) make contact from above with the chip on a card (7) that has been inserted. Thus, with this embodiment of a keyboard with card reader according to the invention, a card (7) has to be introduced in the orientation to which the user is accustomed, i.e. with the chip facing upward.

A keyboard with card reader according to the invention has a desired flat configuration, and despite its flat shape the card reader is of ergonomically convenient design and is simple to operate. Thus, a card placed on the card holder section can be inserted into the card reader with only one finger, without risk of bending the card. During this, the necessary path for inserting the card is reduced to a fraction, preferably one-third to half the length of the card. Accordingly, preferably half to two-thirds of a card inserted into the card reader can still be seen by the user, so it is not so easy for a user to forget the card in the card reader. Moreover, the continual visibility of much of the card inserted in the card reader makes it easier for the user to confirm the correct orientation of the card during its insertion.

Furthermore, the space required on the working surface next to a keyboard with card reader according to the invention for the insertion of a card, is substantially smaller than with a horizontally arranged card reader of the prior art. In embodiments of a keyboard with card reader according to the invention in which the card holder section is of appropriate size, there is no need at all for free space on the adjacent working surface to allow insertion of a card into the card reader.

Moreover, owing to its integrated structure, a keyboard with card reader according to the invention can be produced inexpensively.

LIST OF INDEXES

1 Keyboard
2 Card insertion opening
3 Card holder section
4 Card-supporting surface
5 Guiding element
6 Contacts
7 Card
8 Contactor unit

The invention claimed is:

1. A keyboard with a card reader, the keyboard having fixed height, width and length dimensions, the card reader having a card holder section (3) which defines a plane for placing a card on an upper side of the keyboard (1) and a card insertion opening (2), the card holder section (3) being recessed and located within the fixed height, width and length dimensions of the keyboard,
the card holder section (3) being arranged next to the card insertion opening (2), and
the card being inserted into the card insertion opening (2) substantially parallel to the plane.

2. The keyboard according to claim 1, wherein the card holder section (3) is bounded by an edge of the upper side of the keyboard (1) on a side opposite the card insertion opening (2).

3. The keyboard according to claim 1, wherein the card holder section (3) comprises a guiding element (5) for guiding the card during insertion into the card insertion opening (2).

4. The keyboard according to claim 1, wherein the card holder section (3) is formed by a recess in an upper side of the keyboard (1).

5. The keyboard according to claim 1, wherein the card is inserted into the card reader through the card insertion opening (2) up to approximately one-third of the length of the card.

6. The keyboard according to claim 1, wherein the card reader further comprises a means for wireless communication with a chip-card.

7. The keyboard according to claim 6, wherein the means for wireless communication with the chip-card comprise an antenna arranged under the card holder section (3).

8. The keyboard according to claim 1, wherein electronic circuitry of the card reader is integrated on the printed circuit board of the keyboard (1).

9. The keyboard according to claim 1, wherein the card reader and the card holder section being immovably fixed in relation to the keyboard.

10. The keyboard according to claim 1, wherein the card holder section being formed as a recess in a housing of the keyboard.

11. The keyboard according to claim 1, wherein the card holder section comprises guiding surfaces that extend from an upper surface of the keyboard to the plane on which the card is placed.

12. A keyboard with a card reader, the card reader having a card holder section (3) which defines a plane for placing a card on an upper side of the keyboard (1) and a card insertion opening (2),
the card holder section (3) being arranged next to the card insertion opening (2),
the card being inserted into the card insertion opening (2) substantially parallel to the plane, and
the card holder section (3) has a card-supporting surface (4) with a size in a direction perpendicular to the card insertion opening (2) corresponding to at least half the length of the card.

13. A keyboard with an integrated card reader, the keyboard comprising a body with a generally planar top surface from which a plurality of keyboard keys extend,
a card holder section (3) being located in a rear corner section of the body and comprising front and rear sidewalls (5), a card-supporting surface (4) and an inner sidewall, with bottom edges of the front and the rear sidewalls (5) being united with opposite edges of the card-supporting surface (4) and inner side edges of the front and the rear sidewalls (5) being united with opposite edges of the inner sidewall,
the inner sidewall being uniformly spaced from the card-supporting surface (4) along a distance between the front and the rear sidewalls (5) to define a card insertion opening (2),
the card-supporting surface (4) being planar and parallel to and spaced from the top surface of the body such that the front and the rear sidewalls (5), the card-supporting surface (4) and the inner sidewall define the card holder section (3) as a recess in the body,
a distance between the front and the rear sidewalls (5) being defined by a width of a card and a length of the card-supporting surface (4) being approximately one half to two thirds the length of the card.

* * * * *